United States Patent

Scanlon et al.

[15] 3,664,491
[45] May 23, 1972

[54] CONVEYOR SLAT CONSTRUCTION

[72] Inventors: Robert M. Scanlon, Grand Rapids, Mich.; Hildreth C. Beckwith, Monett, Mo.

[73] Assignee: Granco Equipment, Inc., Grand Rapids, Mich.

[22] Filed: June 11, 1970

[21] Appl. No.: 45,318

[52] U.S. Cl. .......................................... 198/195, 198/219
[51] Int. Cl. ................................................. B65g 15/30
[58] Field of Search .................. 198/219, 195, 197, 199; 238/143, 147

[56] References Cited

UNITED STATES PATENTS 3,455,433  7/1969  Gentry ............................. 198/219 X
1,272,918  7/1918  Cram ............................... 198/219 X

FOREIGN PATENTS OR APPLICATIONS 10,559  2/1910  Great Britain ....................... 238/143

*Primary Examiner*—Evon C. Blunk
*Assistant Examiner*—Hadd S. Lane
*Attorney*—John F. McGarry

[57] ABSTRACT

This disclosure relates to a conveyor slat construction formed of a heat resistant bar and a support structure therefor. The support structure is formed in one piece from an extruded profile. A central portion of the support structure forms a V groove at the top. A bar receiving area is formed from outwardly extending flanges and upwardly extending flanges at the top of the V groove. The sides of the V-shaped groove are biased inwardly thereby compressing the upwardly extending flanges against the bar in the receiving area. A circular notch is formed at the bottom of the V-shaped groove to maintain resiliency within the V-shaped portion. In one embodiment a nut receiving and retaining means is formed at the top of the V-shaped groove and an end block fits within the bar receiving area at the end of the bar. The end block is held in place by fastening means which extend through the end block and engage the retaining means.

11 Claims, 5 Drawing Figures

INVENTORS
ROBERT M. SCANLON
HILDRETH C. BECKWITH
BY John E. McGary

CONVEYOR SLAT CONSTRUCTION

This invention relates to a conveyor slat construction and to a support member used in the slat construction. In one of its aspects, the invention relates to a bar and a support therefor wherein the support is made from a one-piece extruded profile.

In U.S. Pat. No. 3,469,675, there is disclosed and claimed a conveyor system and a slat construction therefor. The conveyor is adapted for conveying extruded products away from an extrusion press. The slat construction is comprised of a longitudinal slat member or bar and a supporting member therefor. The disclosed supporting means is formed of a pair of sheet metal members spaced apart at the top and joined together through rivets, welds or the like. Each of the supporting members has an outwardly extending flange and upwardly extending flange forming a slat receiving portion. The slat members are compressed by the shape and construction of the slat support.

I have now discovered that the supporting structure of said U.S. Pat. No. 3,469,675 can be made in a one-piece extrusion profile by forming a V-shaped groove in said profile by which groove the slat receiving portion can be spread apart for insertion of the slats or bars and contracted after insertion of the slats or bars to hold the same firmly within the support.

By various aspects of this invention one or more of the following, or other, objects can be obtained.

It is an object of this invention to provide a slat construction for conveyors and the like, the slat construction being characterized by ease of manufacturing due to a unitary construction of the slat supports.

It is another object of this invention to provide a simplified slat construction for conveyors and the like useful in removing extruded metal products from an extrusion press.

It is yet another object of this invention to provide an improved slat construction which can be manufactured with fewer steps for lower labor cost.

It is further object of this invention to provide a slat construction formed of a one piece extruded support having a simplified means for fastening bar retaining end blocks to a main support member.

Other aspects, object, and the several advatages of this invention are apparent to one skilled in the art from a study of this disclosure, the drawings, and the appended claims.

According to the invention there is provided a slat construction for conveyors and the like. The slat construction comprises a longitudinal heat resistant bar having flat side walls and supporting means for said bar. The supporting means are formed from a one-piece extrusion having a central portion extending upwardly and forming a V groove at the top thereof. The supporting means extends outwardly and then upwardly from each side of the V groove forming sides of a bar receiving portion. The V groove is so formed such that the side portions thereof are biased towards each other thereby compressing the upwardly extending sides of the support against the side walls of the heat resistant bar. In this manner, the bar is held in firm engagement with the supportings means.

The invention will now be described with reference to the accompanyings in which.

Figure 1:
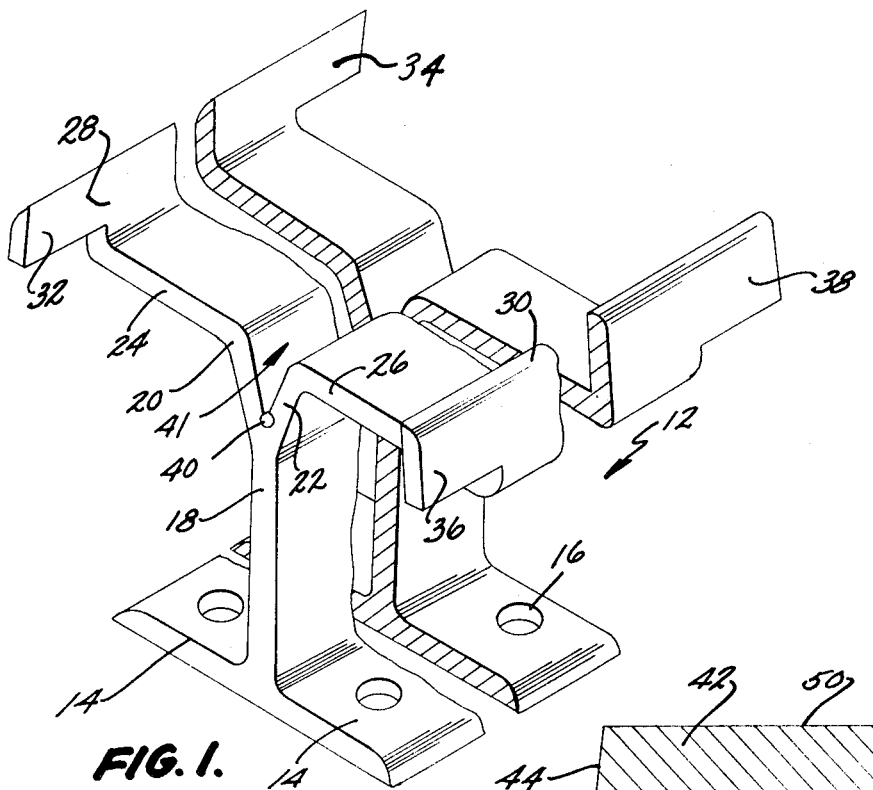
FIG. 1 is a perspective view of a support member according to the invention having a longitudinal central portion removed.

Referring now to the drawings, and to FIG. 1 in particular, there is shown a slat supporting member 12 formed in one piece from an extrusion profile. The slat supporting member has laterally extending base flanges 14 having holes 16 for securing the base flanges to a conveyor belt. An upstanding central portion 18 extends upwardly from base flanges 14 and forms a V-shaped groove 41 through upwardly and outwardly extending portions 20 and 22 at the top thereof. Laterally extending portions 24 and 26 extend from either side of the V-shaped arms 20 and 22 and join upwardly extending side flanges 28 and 30. End tabs 32 and 34 extend laterally from either end of the side flange 28 and end tabs 36 and 38 extend laterally from either end of the side flange 30. A circular notch 40 is formed at the bottom of the V-shaped groove 41.

For purposes of illustration, the slat support member 12 is shown with the central portion removed. Normally, the slat support member will extend longitudinally a considerable distance. For example, for a slat support member having a height approximately 3 inches, the length of the slat support member will be about two feet.

Figure 2:
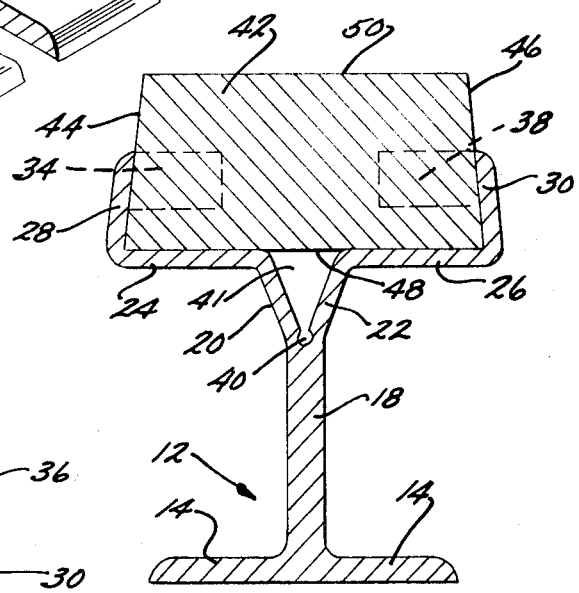
FIG. 2 is a cross section through the support illustrated in FIG. 1 and having a bar positioned within the support, illustrating a completed slat construction.

The completed slat construction is illustrated in FIG. 2. The slat support member 12 secures a bar or slat 42 which can be constructed of wood or carbon. The bar 42 has upwardly and inwardly sloping sides 44 and 46, a bottom 48 and a top 50. As seen in FIG. 2, the side flanges 28 and 30 extend upwardly and inwardly following the sides 44 and 46 of the bar 42. The shape of the slat receiving portion of the slat support member 12 with respect to the bar 42 is such that the sides 20 and 22 are biased inwardly thereby forcing side flanges 28 and 30 against the sides 44 and 46 of bar 42. In the assembled position, the tabs 34 and 38 are bent inwardly at one end of the bar 42 to restrain the bar laterally within the slat support member 12. Similarly tabs 32 and 36 are bent inwardly at the other end of bar 42.

In the slat construction, the side flanges 28 and 30 compress the bar 42 which, in the case of carbon, has limited impact strength. The compression of the bar tends to improve the impact strength somewhat and also reduces breakage of the bar 42 by holding the bar tightly within the support structure. The slat can therefore be inverted in the conveyor system without losing the carbon bar. The compressive relationshiop between the support structure and the carbon bar eliminates any slop or movement of the bar within the support structure. The invention eliminates notches or grooves in the bar 42. Elimination of notches or grooves in the bar 42 decreases the cost of those bars as well as improves the life span thereof.

The circular notch 40 at the base of the V groove 41 is important in maintaining the resiliency and flexibility of the slat receiving portion. The circular notch eliminates a stress riser effect which would be present if the V notch ended in a point.

Figure 3:
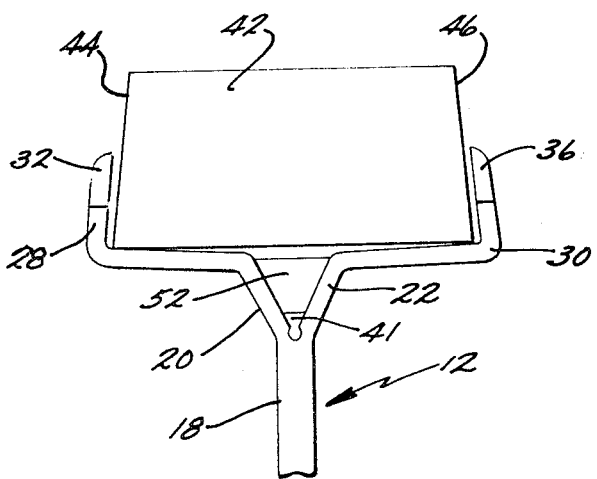
FIG. 3 is an end view of a slat illustrating the method of construction.

The ease of manufacture of this construction is illustrated in FIG. 3 to which reference is now made. Initially, the slat support member 12 is formed in a profile in the exact shape in which it is used. Holes 16 (FIG. 1) are machined from the bottom flanges and the profile is cut lengthwise, forming tabs 32, 34, 36 and 38. A wedge 52 is put in each end of the cut blank and pushed downwardly until the side flanges 28 and 30 are spread apart sufficiently to permit the bar 42 to be conveniently inserted within the receiving portion of the support member 12. The bar is then placed within the slat receiving portion of the support member 12, the wedges 52 are removed from each end of the V groove 41, and the end tabs 32, 34, 36 and 38 are bent around inwardly on either end of the bar 42. This completes the slat construction. The support member 12 can then be bolted through the base flanges 14 and holes 16 to a conveyor belt (not shown).

The slat construction is formed by two easily made parts. The parts themselves are easily constructed to form a durable, yet inexpensive slat for a conveyor belt. If desirable, the bars 42 can be easily and quickly replcaed by removing the broken bars, inserting a wedge 52 into the V groove 41 and inserting a new bar 42 in the same manner as has been described above.

The one-piece integral slat supporting member is desirably made from an extrusion profile. Accordingly, the slat supporting member 12 is made from an extrudable material such as aluminum or an aluminum alloy.

Figure 4:
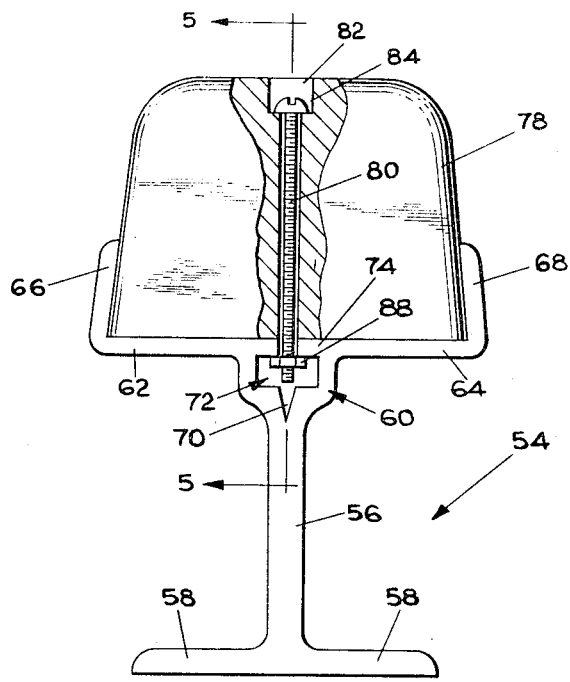
FIG. 4 is an end view of a modified slat construction.
Figure 5:
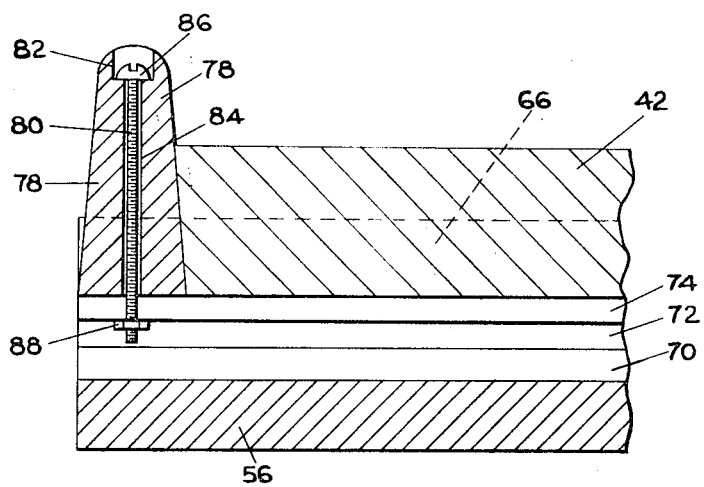
FIG. 5 is a partial sectional view taken along line 55 of FIG. 4.

Reference is now made to FIGS. 4 and 5 which show a modified form of the invention. A modified slat supporting member 54 has an upstanding central portion 56 with laterally extending base portions 68 at the bottom thereof. In use, the slat supporting member 54 is fixed to a conveyor belt through the laterally extending base portions 58. An expanded top 60 is formed on the central portion 56 and joins laterally extending portions 62 and 64. Upwardly extending side flanges 66 and 68 along with the laterally extending portions 62 and 64 form the receiving area for the carbon bar 42. The expanded top 60 has a V-shaped notch 70 extending along the length thereof. A central slot 72 also extends along the length of the support member 54 and is dotted on the top by inwardly extending ledges 74 and 76. The central slot 72 communicates with the V-shaped notch 70 at the bottom portion thereof.

An end block 78 is positioned at each end of the carbon bar 42 to restrain the bar against longitudinal movement within the slot support member 54. The end block 78 has a vertical bore 80 terminating in a recessed cavity 82 at the upper portion thereof. A screw 84 has a head 86 which is seated in the recessed cavity 82 and extends down through the vertical bore 80 and into the central slot 72. A nut 88 is positioned within the central slot 72 and threadably engages the bottom portion of the screw 84. The top of the nut 88 abuts against the inwardly extending ledges 74 and 76. In this manner, the end block 78 is firmly fixed in place in the end of the slat support member 54.

In assembling the modified slat construction illustrated in FIGS. 4 and 5, the carbon bar 42 is inserted into the slot receiving area in a manner similar to that described above with reference to the slat construction illustrated in FIGS. 1 through 3. The side flanges 66 and 68 are spread apart, preferably with the use of a wedge similar to that illustrated in FIG. 3 so that the carbon bar 42 can be easily inserted into the bar receiving area formed by the slat support member. The wedges are removed, whereupon the side flanges 66 and 68 come into contact with the sides of the bar 42, preferably in compressive relationship therewith. End blocks 78 are then slid into the end of the slat support member 54 and with the nut 88 threadably engaging the screw 84 and loosely fitting within the central slot 72. The screw 84 is then tightened with a screw driver for example until the nut 88 is firmly secured against the inwardly extending ledges 74 and 76.

In the event that the bars 42 need be replaced, the end blocks 78 are easily removed by loosening the screw 84 and sliding the end blocks from the end of the support member 54. A new bar 42 can then be inserted in the same manner as described above.

It is apparent from the drawings, that the top portion of the end block 78 extends above the top furface of the bar 42. In this manner, the extruded products which are supported by the bar 42 are retained within the ends of the slat.

The end blocks 78 can be made from any suitable material such as wood or metal. Metal such as aluminum is preferred.

The invention has been described with reference to a carbon bar 42. However, it is within the scope of the invention to use other heat resistant material such as wood.

The invention provides a simple economic construction which can be easily assembled and disassembled to replace broken or worn parts. The supporting members are easily and quickly manufactured in the proper shape by extrusions which, as in the case of the embodiment illustrated in FIGS. 4 and 5, requires no further modification except cutting to length, in order to adapt the profile for the completed slat construction. In addition, the profile of FIGS. 4 and 5 has integrally formed therewith a slot by which the end block can be retained. The slat construction is relatively inexpensive in completed form, the parts themselves are less expensive to manufacture, and the parts are easier and less expensive to assemble into the finished slat construction.

Reasonable variation and modification are possible within the scope of the foregoing disclosure, the drawing, and the appended claims without departing from the spirit of the invention.

The embodiments of the invention in which an exclusive property or privilege is claimed are defined as follows:

1. A slat construction comprising:
   a longitudinal heat resistant bar having flat side walls;
   supporting means for said bar, said supporting means engaging said bar and being formed from a one-piece extrusion having an upstanding central support member terminating at its upper end in a pair of upwardly extending resilient diverging arms, leaving a V-shaped groove therebetween, said diverging arms terminating at their upper portions in a pair of laterally extending members extending outwardly of said arms and forming a supporting base for said bar; each of said laterally extending portions having at its outer edge an upstanding side flange engaging the side walls of said bar and in compressive relationship therewith;
   said support means being formed of a resilient material, and said diverging arms being of such dimension to permit resilient spreading and return of said laterally extending members and side flanges to permit insertion and removal of said heat resistance bar without compression of said bar.

2. A slat construction according to claim 1 further comprising end tabs integrally formed with said supporting means extending laterally inwardly from the ends of said upstanding side flanges to retain said heat resistant bar longitudinally within said supporting means.

3. A slat construction according to claim 1 further comprising a circular notch formed at the bottom of said V-shaped groove to maintain the resiliency of said diverging arms.

4. A slat construction according to claim 1 wherein said side walls of said bar are sloped upwardly and inwardly, and said upstanding side flanges conform with the shape of said side walls of said bar.

5. A slat construction according to claim 1 wherein said supporting means is made from an aluminum containing extrusion profile.

6. A slat construction according to claim 1 further comprising: end blocks on either side of said bar within said slat supporting means and restraining the longitudinal movement of said bar within said slat supporting means; and fastening means extending through said end blocks, there being means integrally formed in said V groove to engage said fastening means whereby said end blocks are securely held on said slat supporting means.

7. A support member for use in a conveyor system, said support member comprising:
   a one-piece extruded profile of a resilient material and having a central supporting portion terminating at its upper end in a pair of upwardly extending resilient diverging arms forming a V-shaped groove at the top thereof;
   said support member having base members extending laterally outwardly of said V-shaped groove from the upper portions of said resilient arms and said base members having side flanges extending upwardly thereof forming a receiving area for a bar, whereby said base members and said arms are resiliently mounted on said diverging arms;
   said diverging arms being dimensioned so as to permit spreading of said receiving area by resilient movement of said arms away from each other when a wedge is forced within said V groove to permit insertion of a bar shaped to fit within said receiving area, whereupon removal of said wedge biases said side flanges against the sides of said bar to maintain said bar firmly within said receiving area.

8. A support member according to claim 6 further comprising a circular notch at the base of said V-shaped groove.

9. A support member according to claim 6 wherein said support member is constructed of an aluminum containing material.

10. A slat construction comprising:
    a longitudinal heat resistant bar having upwardly and inwardly inclined side walls;
    supporting means for said bar engaging said bar, said supporting means being formed from a one piece extrusion and having a central portion extending upwardly and terminating at its upper end in a pair of upwardly extending resilient diverging arms, said diverging arms forming a lateral indented slot therebetween at an upper portion of said arms; said supporting means extending outwardly from an upper portion of said arms beneath said heat resistant bar and then upwardly and inwardly along the side walls of said bar, thereby retaining said bar within said supporting means;

end blocks in said supporting means at either end of said longitudinal heat resistance bar restraining longitudinal movement of said bar within said supporting means;

fastening means extending through said end blocks and engaging said lateral slot to secure said end blocks to said supporting means.

11. A slat construction according to claim 10 wherein said fastening means comprises a threaded member extending through each of said end blocks and a nut in said lateral slot threadably engaging the bottom portion of each of said threaded members.

* * * * *